United States Patent [19]

Lambe

[11] Patent Number: 5,109,905
[45] Date of Patent: May 5, 1992

[54] DUAL CHAMBER PNEUMATIC TIRE WITH THE CHAMBERS SEPARATED BY A COLLAPSIBLE PARTITION WALL

[76] Inventor: Donald M. Lambe, 5015 Ponvalley, Bloomfield Hills, Mich. 48013

[21] Appl. No.: 610,743

[22] Filed: Nov. 8, 1990

Related U.S. Application Data

[63] Continuation-in-part of Ser. No. 380,860, Jul. 17, 1989, abandoned, which is a continuation-in-part of Ser. No. 154,453, Feb. 8, 1988, abandoned, which is a continuation of Ser. No. 798,839, Jan. 21, 1986, abandoned, which is a continuation of Ser. No. 284,773, Jul. 20, 1981, abandoned, which is a continuation-in-part of Ser. No. 79,315, Sep. 27, 1979, Pat. No. 4,293,017, which is a continuation-in-part of Ser. No. 856,294, Dec. 1, 1977, abandoned.

[51] Int. Cl.⁵ .................... B60C 5/22; B60C 17/01
[52] U.S. Cl. .................. 152/342.1; 152/339.1; 152/518
[58] Field of Search .......... 152/151, 152, 331.1, 152/339.1, 340.1, 341.1, 342.1, 502, 510, 195, 514, 515, 516, 518, 519, 343.1, 344.1

[56] References Cited

U.S. PATENT DOCUMENTS

| | | | |
|---|---|---|---|
| 2,244,941 | 6/1941 | Degnon | 152/341.1 |
| 2,524,808 | 10/1950 | Khalil | 152/340.1 |
| 2,525,752 | 10/1950 | Khalil | 152/340.1 |
| 2,665,731 | 1/1954 | Slezak | 152/341.1 |
| 4,293,017 | 10/1981 | Lambe | 152/339.1 |

FOREIGN PATENT DOCUMENTS

| | | | |
|---|---|---|---|
| 2430638 | 5/1976 | Fed. Rep. of Germany | 152/418 |
| 2517895 | 11/1976 | Fed. Rep. of Germany | 152/339.1 |
| 324270 | 3/1903 | France | . |
| 1266629 | 6/1961 | France | 152/341.1 |
| 34-5751 | 7/1979 | Japan | 152/342 |
| 102361 | 6/1953 | Norway | 152/339.1 |
| 12949 | of 1909 | United Kingdom | 152/340.1 |

Primary Examiner—Michael W. Ball
Assistant Examiner—Gregory J. Wilber
Attorney, Agent, or Firm—Gifford, Groh, Sprinkle, Patmore and Anderson

[57] ABSTRACT

A dual-chamber pneumatic tire having two separate concentric annular air chambers. The outermost air chamber, disposed behind the tire tread normally in contact with the ground has a relatively small volume, is toroidal and substantially elliptical in cross-section and is inflated at a higher pressure than the innermost chamber disposed in the remaining volume of the tire. The two chambers are separated by an elastically deformable, collapsible partition wall or diaphragm which is integrally attached to the interior tread surface near the sidewalls or which is, alternatively, made removable. The low pressure innermost chamber is inflated by means of a conventional air valve or by a regulator valve between the innermost chamber and the outermost chamber, while the outermost chamber is inflated by means of an air valve connected to the wall or diaphragm by means of flexible hose, or, alternatively by a valve disposed at the base of the tire sidewalls. The structure of the invention is particularly adapted to tubeless tires.

8 Claims, 4 Drawing Sheets

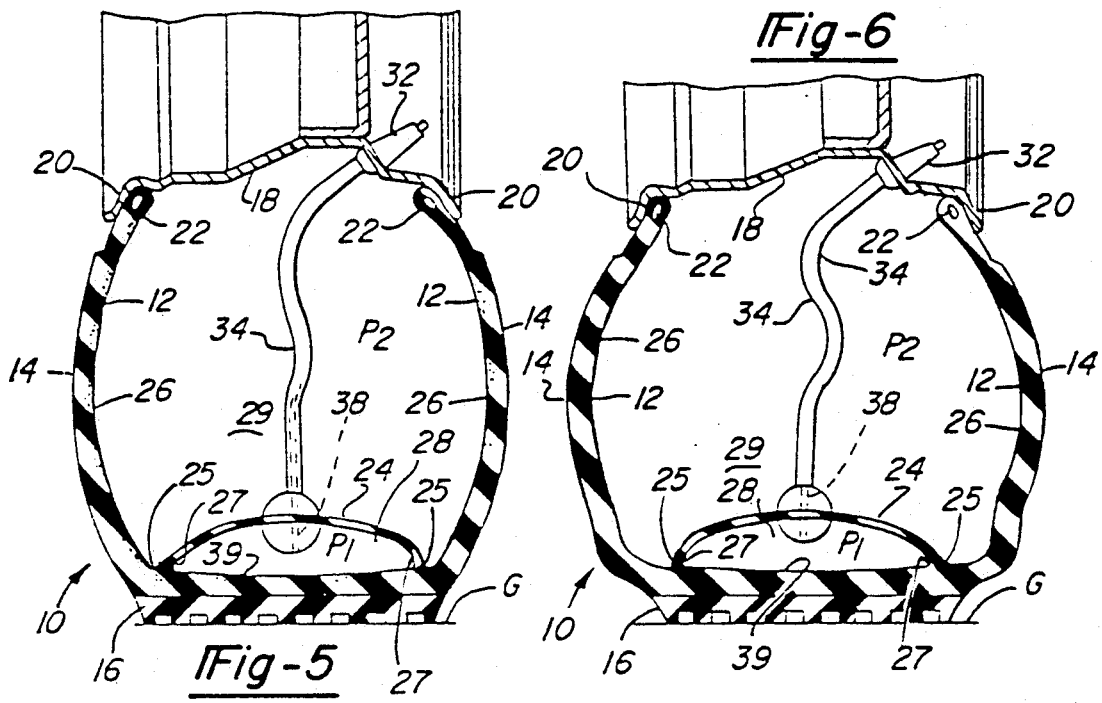
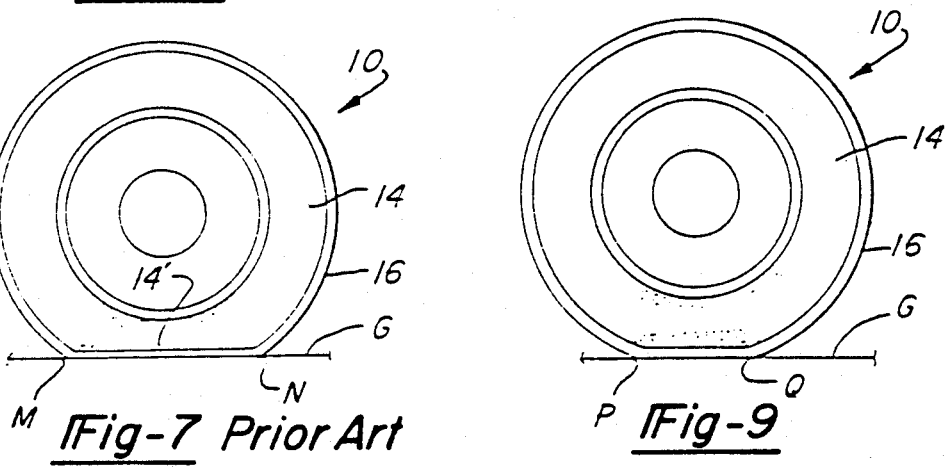
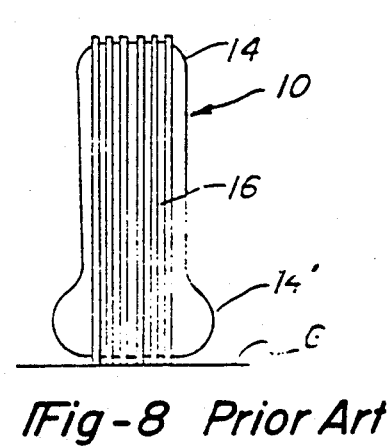
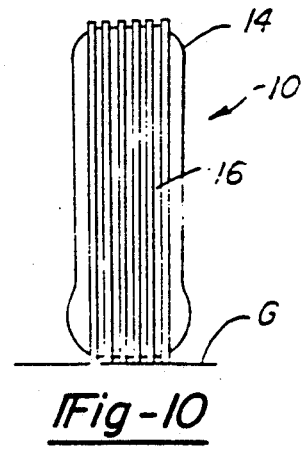

DUAL CHAMBER PNEUMATIC TIRE WITH THE CHAMBERS SEPARATED BY A COLLAPSIBLE PARTITION WALL

CROSS REFERENCE TO RELATED APPLICATIONS

The present application is a continuation-in-part of application Ser. No. 07/380,860, filed Jul. 17, 1989, now abandoned, which is a continuation-in-part of application Ser. No. 154,453, filed Feb. 8, 1988 now abandoned, which is a continuation of application Ser. No. 798,839, filed Jan. 21, 1986 now abandoned, which is a continuation of application Ser. No. 284,773, filed Jul. 20, 1981 now abandoned, which is a continuation-in-part of application Ser. No. 079,315, filed Sep. 27, 1979, now U.S. Pat. No. 4,293,017, issued Oct. 6, 1981, which is a continuation-in-part of application Ser. No. 856,294, filed Dec. 1, 1977, now abandoned.

BACKGROUND OF THE INVENTION

Conventional pneumatic tires for wheeled vehicles, such as automobiles and trucks, rely on a single air chamber inflated at uniform pressure for both operational economies and absorption of road shocks and bumps. However, shock absorption is accomplished most effectively with relatively low pressure tires, whereas improved fuel economy, driving range, acceleration, cruising speed, ease of steering and durability of the tires are more aptly achieved with relatively high pressure tires. Therefore, conventional single chamber tires are a compromise between inherently conflicting requirements.

The present invention relates to pneumatic tires for wheeled vehicles, and more particularly to an improved tubeless pneumatic tire provided with a pair of concentric annular air chambers inflated at different air pressures, the pressure in the outermost chamber being higher than the pressure in the innermost chamber. The present invention thus provides a design which separates the two conflicting requirements of a pneumatic tire so that each of these two requirements can be met separately and in a more optimum fashion; a relatively low-pressure inner chamber is provided for efficient shock-absorption, and a relatively high-pressure outer chamber is provided for operating efficiency and economy. At the same time, the essential balloon-like flexion of a single-chamber tire is retained through a dual-chamber structure which includes no internal dividers or other components which restrict, impede or obstruct the flexion and shock-absorption of any portion of the sidewalls or tread area of the tire.

Attempts have been made in the past to design pneumatic tires with multiple air chambers, as disclosed, for example, in U.S. Pat. Nos. 2,196,814, 2,525,752, 2,735,471 and 2,925,845, in British Patent Specification No. 347,690, in German Patent Publication Nos. 2,517,895 and 2,430,638, and Japanese Patent No. 34-5751. Such designs provide multi-chamber pneumatic tires which are structurally divided by heavy, rigid or semi-rigid partitions in fixed locations and shapes, and which, therefore, require complex and costly molds and processes for manufacturing, resulting in heavy inert structures using a large volume of solid rubber or other casing material as compared to the volume of air contained in the air chambers, with the resulting inconvenience of high cost raw materials, a critical lack of flexibility in the resulting tires, heavy inertial masses in rotation, and substantial constant friction and deformation of elastomeric material causing considerable heating. These prior designs also fasten together or otherwise anchor various areas of the sidewalls or tread through rigid, semi-rigid or structurally inert dividers or reinforcements, so that the essential balloon-like bowing and flexion of a single-chamber tire is lost. In the FIG. 1 embodiment of German Patent Publication No. 2,430,638, the sidewalls are tied together with a partition wall which is stretched under tension into a straight line, so that the sidewalls cannot freely bow away from one another.

Other designs have been proposed for pneumatic tires such as disclosed in U.S. Pat. Nos. 2,780,266, 2,508,596, 2,560,609 and 2,480,463, and in the aforementioned German Patent Publications, for example, which are, for all practical purposes, directed to concentrically mounting a pair of pneumatic tires, one within the other, with the added complication of rendering such compound pneumatic tires incapable of being mounted on conventional wheel rims.

Further efforts in designing multi-chamber pneumatic tires are represented by structures such as disclosed in U.S. Pat. No. 1,989,402 wherein a pneumatic tire having much analogy with a conventional tire is provided with an auxiliary tread mounted thereon by rivets, or other fasteners, such auxiliary tread being provided with a built-in air chamber, and in U.S. Pat. No. 2,850,069 there is a teaching of a multi-chamber inner tube for pneumatic tires requiring special rims or special retaining flaps mounted within the inner tube.

However, all prior art has failed to integrate the major features necessary to effectively combine fuel efficiency and effective shock-absorption, including (1) unimpeded and unobstructed flexion of the tread and sidewalls of the tire comparable to that of a conventional single-chamber tire, (2) minimum bulk and weight, (3) an elastically-deformable and collapsible diaphragm with no internal or external supports of a fixed, rigid or semi-rigid nature, (4) optimum relative size of the chambers, (5) a relatively large cross-section and floor for the low-pressure chamber, (6) convenient, secure and independent control of pressures in individual chambers, (7) simplicity of design, and (8) safety features to minimize and contain blowouts of high-pressure tires.

SUMMARY OF THE INVENTION

The present invention remedies the inconveniences and shortcomings of the prior art by providing a simple structure, more particularly for tubeless pneumatic tires, which requires no special rim construction or adapters, which can readily be mounted on a conventional wheel rim in the place of a conventional tubeless tire, which greatly increases fuel efficiency, performance and driving range by reducing drag and friction, which enhances the riding comfort and the overall shock-absorbing quality of the tire, which increases road stability at high speed and steerability of a motor vehicle as compared to conventional tires, and which greatly decreases wear and tear of the engine. By providing improved fuel efficiency, this invention also helps to relieve important national and international issues, including oil import requirements, balance of trade concerns, environmental pollution from emissions and the economic feasibility of alternate fuels. Such results are accomplished by the present invention by forming a relatively small volume concentric separate toroidal peripheral air chamber in a pneumatic tire otherwise of conventional structure, such separate toroidal peripheral air chamber being substantially elliptical in cross-section when normally inflated with air at a pressure higher than that in the separate relatively large chamber concentrically disposed within the casing between the peripheral chamber and the wheel rim. The two air chambers are separated by a flexible and elastically-deformable wall or diaphragm which is permanently located in the interior of the pneumatic tire casing, or alternatively, which is removable. The edges of the wall or diaphragm are attached to the interior of the tread area of the tire, near the points where the tread joins the sidewalls.

The diaphragm is comparable in weight and mass to a conventional inner tube, minimizing unsprung weight. The diaphragm is also wider than the tread area to which it is attached, so that when the outer chamber is inflated at relatively high pressure, the diaphragm arches upward away from the tread area to avoid puncture. The added width of the diaphragm also provides a surface area greater than that of the tread area, and therefore a proportionately larger floor for the low-pressure inner chamber for improved weight distribution and support and improved lateral stability. In addition, the diaphragm is collapsible, being held in position only by the higher air pressure in the exterior chamber of the tire. When this higher pressure is not present in the outer chamber, the diaphragm collapses and falls to a loose and relaxed position on the interior floor of the tire. Because the diaphragm is collapsible, and because it has no internal or external reinforcements or supports to stabilize its position or shape, and no intrinsic structural inertia or tension, it provides for unimpeded and unobstructed flexion of any and all areas of the sidewalls and tread of the tire and preserves unrestricted bowing of the sidewalls for optimum shock absorption.

Because the outermost, or peripheral, air chamber is inflated at a relatively high pressure, there results a considerable reduction of the surface area in contact with the road, and of the flexing of the tire tread, and thus a considerable reduction of the ground drag and friction, and of loss of energy due to the deformation and flexion of the tread and sidewalls, as compared to conventional tires.

The amount of energy required for propelling the vehicle at a given velocity is consequently considerably reduced, which in turn causes a sizable increase in driving range and reduction in fuel or energy consumption. It also permits improved acceleration and performance, use of smaller engines, or both.

However, because the inner chamber of the pneumatic tire of the invention is relatively large and is inflated at a relatively low air pressure, because all sidewall surfaces are subject to only relatively low pressure for increases flexability, and because the dual-chamber structure is accomplished without introducing heavy, rigid or semi-rigid components held in permanent shapes and positions, or components with intrinsic structural inertia or tension, and without impeding or obstructing the flexion of the tire or the outward bowing of the sidewalls, the shock absorbing capabilities and riding comfort of a tire according to the invention are enhanced relative to a conventional pneumatic tire.

In addition, in view of the dual air chamber structure of a pneumatic tire according to the invention, safety is greatly enhanced as a blowout is generally limited to one of the air chambers, most likely the outer high pressure chamber, and the tire will remain partially inflated and capable of continuing its function, even though it may be desirable to slightly reduce the speed of travel of the vehicle after a puncture has caused air to be exhausted from one of the chambers. Blowout hazards are also minimized by the relatively small size of the high-pressure chamber, the absence of rigid or heavy internal components, and the ability of the large low-pressure chamber to absorb and contain internal blowouts.

The many advantages and objects of the present invention will become apparent to those skilled in the art when the following description of the best modes contemplated for practicing the invention is read in conjunction with the accompanying drawing, wherein like numerals refer to like or equivalent parts, and in which:

BRIEF DESCRIPTION OF THE DRAWINGS

FIGS. 1–3 depict in schematic form the flexing of a tire when it encounters a bump or object in the road wherein, FIG. 1 is a partial cross-sectional view of a tire when the side area of the tread strikes a bump, curb or other object close to the edge of the tread;

FIG. 2 is a partial cross-sectional view similar to FIG. 1 showing a tire encountering an object at the center of the tread;

FIG. 3 is a partial cross-sectional view similar to FIGS. 1 and 2 illustrating a tire encountering a wide pothole, large road seam or other wide depression or wide object which results in a heavy shock distributed across the width of the tread;

FIG. 5 is a transverse section of the pneumatic tire according to the invention taken along line 5—5 of FIG. 4;

FIG. 6 is a view similar to FIG. 5 but showing the tire of FIGS. 4–5 under the influence of a heavy road shock distributed across the whole tread area;

FIG. 7 is a schematic side elevation view of a normally loaded low pressure conventional tire;

FIG. 8 is a schematic front elevation view of the tire shown in FIG. 7;

FIG. 9 is a schematic side elevation of a normally loaded tire according to the structure of the present invention;

FIG. 10 is a schematic front elevation view of the tire shown in FIG. 9;

DETAILED DESCRIPTION OF THE PREFERRED EMBODIMENTS

In order for a tire to absorb shocks when a bump or other shock-causing object is encountered in the road, the area of the tire which strikes the bump or object must be able to flex inwardly, and the sidewalls of the tire must be able to bow outwardly. This shock-absorbing action is illustrated in FIGS. 1 and 2.

Figure 1:
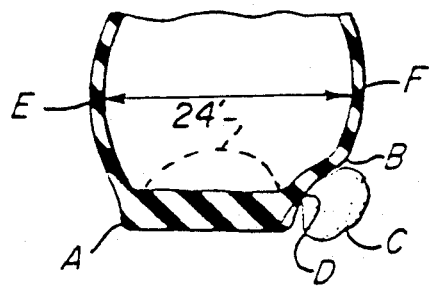

As shown in FIG. 1, depicting a cross-sectional view of a tire, when the side area of the tread strikes a bump, curb or object C, that side are of the tread flexes inwardly, forming a concave arc at the bottom edge of the tire from one edge B of the tread point D. This flexion alters the relative positions of, and distance between, tread edges A and B. At the same time, the sidewalls bow outwardly, increasing the distance between the sidewalls, such distance being shown as the line from points E to F. Any heavy rigid, semi-rigid or other structural element which interconnects the two sidewalls or any element fixed in a position or shape inside the tire so as to resist this flexion of the tread or restrict the outward bowing of the sidewalls thus defeats effective shock absorption. The diaphragm 24 of this invention shown in phantom at 24', indicates that the natural flexion is not disturbed by its presence.

Figure 2:
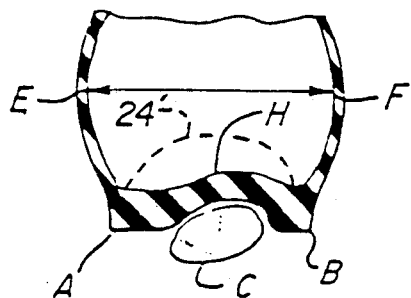

Similarly, as shown in FIG. 2, also a cross-sectional view of a tire, when an object or bump strikes the center of the tread area, that central area H flexes inwardly to absorb the shock, pulling the tread edges A and B closer together. At the same time, the sidewalls bow outwardly, increasing the distance between the sidewalls, shown as the line between points E to F. Again, any structural element of a rigid or semi-rigid nature inside the tire and any interconnection of the sidewalls that resists, obstructs or impedes such flexion of the tread or bowing of the sidewalls serves to defeat effective shock absorption.

Figure 3:
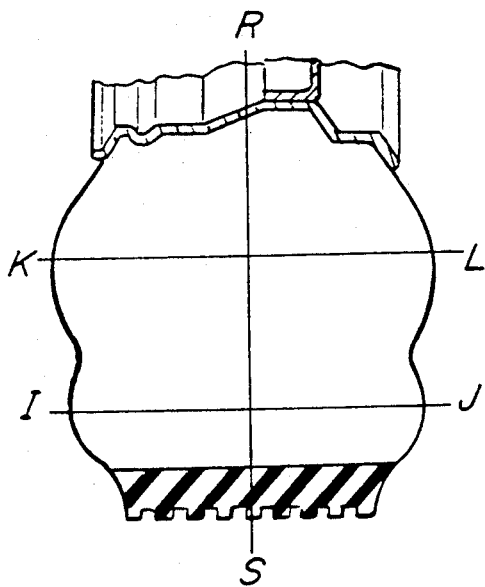

FIG. 3 shows a cross-sectional view of a conventional, single-chamber tire, illustrating the means by which a shock is absorbed when a road depression, bump or object places a heavy shock across the entire width of the tread.

There are three separate but related parts to this shock-absorption process. First, the tread area of the tire is driven upward, toward the rim of the tire, so that the distance from the tread to the rim, along the line R-S, is discussed. Second, the base area of each sidewall bows sharply outward close to the local point of impact, forming a convex bubble or teardrop pattern, and significantly increasing the distance between the sidewalls at their extreme bases, such distance being shown as line I-J. Third, the sidewall surfaces above their base areas also bow outwardly, spreading the two sidewalls apart and increasing the distance between them, such distance being shown as line K-L.

As can be seen from this illustration, any partition wall or other component is disfunctional when it ties the sidewalls together, or otherwise restricts their ability to bow outwardly and spread apart from one another. Such a partition wall directly interferes with effective shock-absorption and abandons the shock-absorbing capabilities of conventional tires. This is true even is such a partition wall is connected to the lower portion of the sidewall, since this restricts or prevents the sharp, localized bowing at the extreme base of the sidewall, which is precisely where most road shocks are encountered.

The primary principle illustrated in FIG. 1-3 is that to preserve effective shock absorption in a tire, any structural ribs, hoops, partitions, partition footings or other elements added to a tire to form multiple chambers must not consist of heavy, inert, rigid or semi-rigid members in a fixed position or shape or components under tension which stabilize the contours of the tire, since this will prevent the independent, localized flexion at the point of impact or otherwise impede or obstruct the flexion of the tread or sidewalls or the outward bowing of the sidewalls.

It is for these reasons that even the relatively recent attempts as shown by the prior art fail to provide a practical dual-chambered tire with effective shock-absorbing qualities. For example, Japanese Patent 34-5751 includes a rigid, fixed, continuous bridge between the sidewalls. This bridge or partition includes metal or hard plastic reinforcements, and the footings of the partition are fastened to approximately one-half the interior area of the sidewalls. In all its various configurations, this bridge or partition serves to anchor or stabilize the tread and sidewall areas and hold them in fixed positions. As a result, the necessary flexion of the tread area and bowing of the sidewalls, as illustrated in FIG. 1-3, is severely impeded or altogether prevented, and effective shock absorption is not possible. Similarly, German Patent 2,517,895 includes a heavy, rigid or semi-rigid continuous bridge that anchors the sidewalls and tread in a fixed position and introduces substantial structural inertia. Further rigidity is added by a heavy, fixed, continuous rib or hoop in the center of the tread area. German Paten 2,430,638, in addition to other design deficiencies, also includes elements which tie the sidewalls together so as to impede or obstruct sidewall flexion and bowing.

Minimum additional bulk and weight is a necessary feature to avoid increasing the unsprung weight of the vehicle. Adding unsprung weight provides increased inertial resistance when an object or bump is encountered, and this inertial resistance causes shocks to be transmitted to the chassis and passengers of a vehicle. Also, the addition of heavy, fixed, rigid or semi-rigid partitions or other elements directly conflicts with effective shock-absorption.

Figure 4:
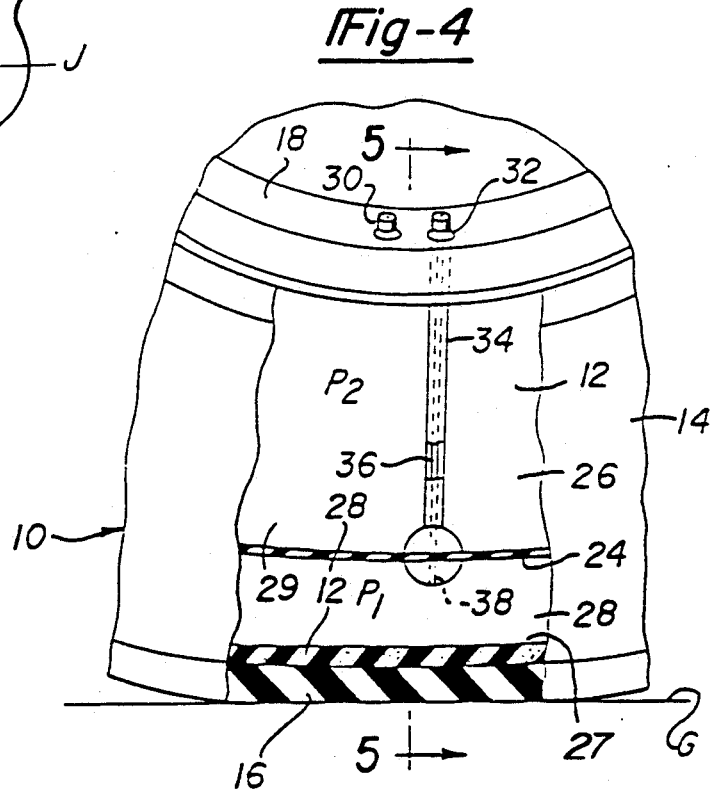
FIG. 4 is a partial side elevation view of a pneumatic tire according to the present invention mounted on a conventional wheel rim, and illustrated with a portion broken away to show the internal construction.

Referring to FIGS. 4-6 of the drawings, there is illustrated an example of structure for a pneumatic tire 10 according to an aspect of the present invention. The pneumatic tire 10 is provided with a casing 12 made in the usual manner of several cored plys of synthetic fiber, glass, or metallic threads, impregnated and coated with vulcanized rubber and provided on its exterior with a layer of vulcanized rubber forming sidewalls 14. A tread 16, in the form of a layer of vulcanized rubber, is integrally disposed on the outside circumference of the tire 10 and forms a resilient bearing surface partially in engagement with the ground G during normal use. The tire 10 is mounted on a conventional wheel rim 18 provided with flanges 20 engaging and holding the tire at the two lateral parallel bead portions 22 of the casing 12. Air valves for both chambers can be separate or integrated into a single stem to accommodate existing wheel rims.

The improvement of the invention consists in providing the tire 10 with a relatively thin, light weight, collapsible, flexible elastically-deformable annular wall or diaphragm 24 integrally attached to the interior tread area 39, as shown at 25 and 27 designating respectively the smooth radius blending of the opposite surfaces of the diaphragm 24 at its edges with interior tread area 39. The partition wall or diaphragm 24 is thin relative to the sidewalls 14 and the tread 16 as shown in FIGS. 4-6 and 11-16 which are substantially scaled-down depictions of the invention, and they reflect the actual and relative dimensions of the diaphragm 24, sidewalls 14 and tread 16. The diaphragm 24 is attached to the inside floor of the tire 39 at two points above the tread 16. The specific points of attachment 25 and 27 are preferably about 1/16" inside the points at which the base of each sidewalls joins the floor or tread area of the tire on the interior surface of the tire. This point of attachment serves two important functional purposes. First, it keeps the entire surface area of both sidewalls, including the extreme base of the sidewalls, under low pressure for maximum flexibility. Second, it avoids any restrictive attachment to any part of the sidewalls, including the extreme base of the sidewalls, so that the unrestricted flexion and bowing of both the base and upper portions of the sidewalls is retained similar to that of a conventional single-chamber tire, as illustrated in FIG. 3.

As an alternative arrangement, the diaphragm can be attached at both sides of the interior tire floor at the very edges of the tread area, where the tread joins the sidewalls. This alternative arrangement thus also keeps the entire surface area of the sidewalls under low pressure for maximum flexibility and retains the same unrestricted bowing and flexion of both the base and upper portions of the sidewalls, similar to that present in conventional single-chamber tires, as illustrated in FIG. 3.

The diaphragm 24 thus defines two concentric air chambers, namely a peripheral or outer generally toroidal annular air chamber 28 which is substantially elliptical in cross-section when the outer chamber, and an annular central or inner chamber the layer inner chamber, and an annular central or inner chamber 29 between the inner wall surfaces 26 of the sidewalls 14 and the wheel rim 18.

The tire 10 of FIGS. 4-6 is of tubeless construction, that is the tire 10 does not require an inner tube and is held on the rim 18 by the air pressure in the inner chamber 29 urging the sidewalls 14 apart from each other and applying the exterior of the bead portions 22 of the tire firmly against the inner surface of the rim flanges 20. Pressurized air is introduced in the inner chamber 29 in the usual manner by means of a conventional tubeless tire air valve 30, FIG. 4, disposed through an appropriate valve aperture through the rim 18. Pressurized air is introduced into the outer chamber 28 by means of a second valve 32, also disposed through an aperture in the rim 18, either proximate to the conventional valve 30, as illustrated, or angularly away from it, at some other location around the rim 18. In order to accommodate existing wheel rims, air valves for both chambers can also be integrated into a single stem with two separate interior passages. The valve 32 is connected by means of a tubular flexible hose 34 having an internal passageway 36 to an inlet aperture 38 formed through the wall or diaphragm 24 for admitting pressurized air into the outer chamber 28 for inflation.

The annular peripheral outer toroidal chamber 28 is normally inflated at a relatively high air pressure P1, while the inner chamber 29 is normally inflated at a relatively low pressure P2. In this manner, the area of the tire tread 16 in contact with the roadway surface is substantially reduced, during normal driving conditions, as compared to the tread area normally in contact with the roadway surface in conventional low pressure cushion tires. Drag, friction, wear, flexion, emissions and distortion of the tire, and heating of the tire, are considerably reduced as compared to conventional tires. All of those advantages add up to providing increased fuel mileage, improved acceleration and performance, increase driving range, considerable reduction of tire wear and pollutants, and a reduction on the load applied to the engine, or other prime mover, of a motor vehicle.

It should be particularly noted that the partition wall or diaphragm 24 is attached at its lateral edges of the inner surface of the tread area 39 near the juncture of the tread area and the inner surface 26 of the sidewalls 14 at points 25, 27. This provides high-pressure support for the entire tread area, and low-pressure support for all sidewall surfaces, and permits maximum practical size and capacity for the shock-absorbing low-pressure chamber. The peripheral chamber 28 has a substantially toroidal shape when inflated at high pressure, with the portion thereof formed by the partition wall or diaphragm 24 elastically bulged toward the inner chamber 29, when the tire is inflated. The inner surface 39 of the chamber 29, disposed proximate to the tread 16, is relatively flat as being substantially parallel to the tread itself. This design and the collapsible nature of the diaphragm results in the diaphragm 24 causing no interference whatsoever with the flexibility of any part of the sidewalls 14, or tread area 16, thus permitting the sidewalls 14 to resiliently flex outwardly with an increase in sidewall loads, or due to heavy shock, in the manner particularly illustrated at FIG. 6. Simultaneously, because the partition wall or diaphragm 24 is relatively thin and very flexible and elastically-deformable, it absorbs shocks rather than transmitting them, and its bulging towards the inner chamber 29 increases, and presents a greater surface area subjected to the action of the low pressure in the inner chamber 29. Consequently, heavy loads and road shocks are absorbed not only by the high pressure peripheral chamber 28, but also in a normal manner and to a relatively greater degree by the large low pressure inner chamber 29, and any momentary increase in area of the partition wall or diaphragm 24 due to the high flexibility and elasticity of the partition wall or diaphragm 24 enables the greatest proportion of the load and shocks to be absorbed by the low pressure air in the inner chamber 29.

Because the pressure P1 in the outer toroidal chamber 28 is greater than the pressure P2 in the inner chamber 29, and although a relatively small tire tread area is needed to support the weight of a vehicle, a correspondingly larger diaphragm surface area, as compared to the tread area, and a wider inner air chamber are needed to support the same weight. Without a larger cross-area and larger floor or load carrying area for the low-pressure chamber, there is a practical limitation as to the variation in pressure between the two chambers which can be accommodated without producing some instability in the tire. The required larger surface are is provided by the annular partition wall or diaphragm 24 having a width substantially larger than the width of the tread 16, the partition wall or diaphragm 24 further bulging and being bowed towards the inner chamber 29 when subjected to heavy loads. By attaching the diaphragm near the base of the sidewall, the circumference or periphery of the diaphragm is maximized, the circumference to a large surface area for the floor or load carrying area of the low-pressure chamber.

When the tire 10 becomes momentarily overloaded, as shown at FIG. 6, as a result of a heavy road shock or bump across the tread area, shock absorption occurs in the same process in which shocks are absorbed in a conventional single-chamber tire, except that shock-absorption is enhanced because the entire surface area of both sidewalls is kept at relatively low pressure for increased flexibility. This low pressure and the total absence of any restrictive attachments to any part of the sidewalls permits the extreme base area of both sidewalls to bow sharply outward away from each other at the point of local impact, and the portion of the two sidewalls above the extreme base area to also bow outwardly, spreading the sidewalls apart from one another as the force of the impact drives the tread area 16 upward toward the rim of the tire.

Shock absorption is also accomplished through deformation of the surface of the tire tread 16, compression of the elastic material of the tread 16 and of the subjacent casing, compression of the outer chamber 28 and increase of the air pressure P1 in the outer chamber, and the resulting flexing and elastic deformation of the diaphragm 24. Deflection and elastic deformation of the diaphragm 24 is unhampered by the tread and by the tire sidewalls 14, due to the lateral edges of the diaphragm being attached at the interior of the tread area 39 at points 25 and 27. The shocks and bumps are smoothly and radially absorbed through compression of the inner chamber 29, as the tire sidewalls 14 bulge outwardly, as shown. Because the diaphragm 24 is bowed toward the inner chamber 29, and because the diaphragm 24 is flexible, collapsible and elastic, flexion of the tread area is unobstructed and unimpeded. The bowing action of the curved sidewalls 14, combined with the relatively low air pressure P2 in the relatively high volume inner chamber 29, provides an efficient cushioning effect, and results in smooth riding qualities of the tire in spite of the relatively high air pressure P1 in the relatively small cross-area outer chamber 28. Both chambers are also free of any protrusions or attachments which inhibit or restrict their compression and movement.

In other words, a pneumatic tire according to the structure of the present invention presents all the advantages of high pressure tires and low pressure tires combined in one tire. Conventional tires, and those of the elliptical type, even when inflated at recommended pressures, cause considerable drag and heating of the tire, high fuel or energy consumption, and hard steering. Conventional tires, even when inflated at recommended pressures, have relatively poor bump and shock absorbing qualities, because under such conditions their sidewalls are under relatively high pressure and therefore are rigid and tend to conduct shocks, rather than easily bowing to effectively absorb shocks.

FIG. 7-8 illustrate schematically a conventional low pressure elliptical pneumatic tire 10 under normal load. For example, with a vehicle gross weight of 3,000 lbs., and assuming that the vehicle weight is evenly distributed, each tire supports 750 lbs. With a normal air pressure of 25 psi in each tire 10, approximately 30 in.$^2$ of the surface of the tire tread 16 are engaged with the ground G, causing considerable deflection and outbulging of the tire sidewalls 14, as shown in 14'. A substantial length of the periphery of the tire, as represented by the line MN in FIG. 7, is engaged with the ground G. By contrast, in a pneumatic tire 10 according to the present invention, FIGS. 9-10, if the pressure in the outer chamber of the tire 10 is increased at 50 psi, and the pressure in the inner chamber is maintained at 25 psi, only approximately 15 in.$^2$ of each tire peripheral tread 16 are engaged with the ground G, as represented by the much shorter line PQ, thus resulting in much less tire deformation and deflection, and greatly reducing drag, fuel consumption, tire heat build-up and wear, and engine wear. In addition, the smaller tread area in contact with the ground greatly decreases steering efforts, permitting the design of motor vehicle steering mechanisms with more responsive ratios and providing additional cost savings and fuel economy by eliminating the need for power steering in many passenger vehicles.

Figures 11, 13:
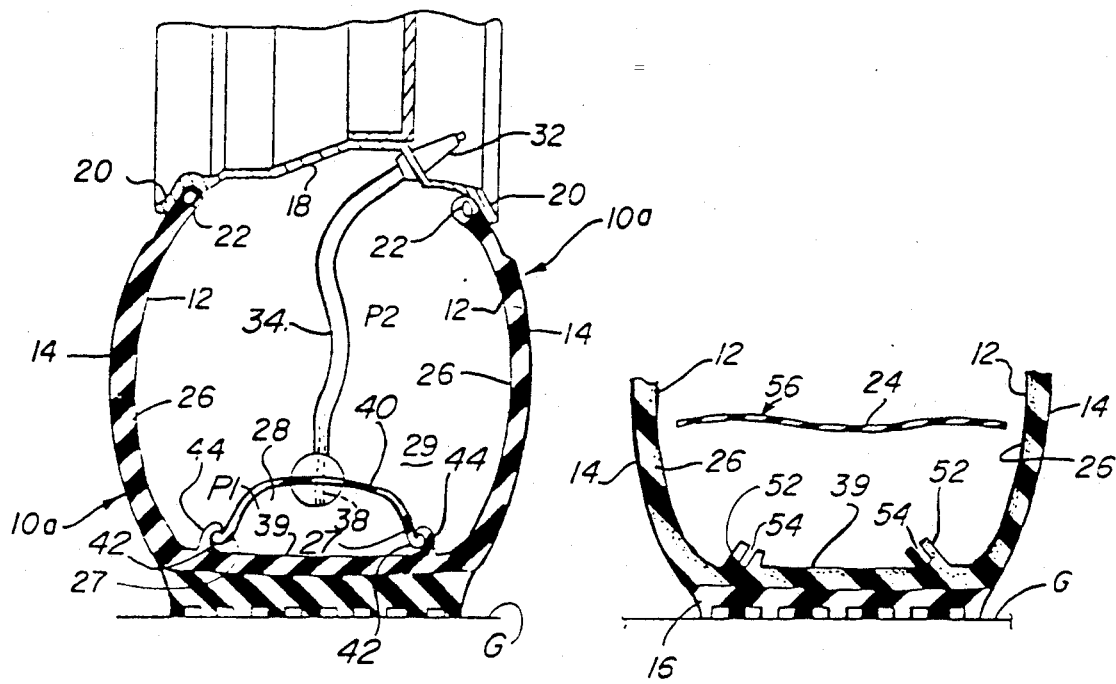
FIG. 11 is a view similar to FIG. 5 but showing a modification of the invention.
FIGS. 13 and 14 are schematic partial cross-section views illustrating an example of consecutive manufacturing steps for a tire according to the invention.

FIG. 11 illustrates a modified structure for a pneumatic tire 10a according to the present invention, in which the flexible and elastically-deformable partition wall or diaphragm 24 separating the outer or peripheral chamber 28 from the inner chamber 29 is in the form of a removable, flexible diaphragm 40 provided at each of its lateral edges with a flanged curvilinear portion 42 interlocking with a corresponding complementary curvilinear annular ridge or bead 44 formed integral on the internal tread surface 39 of the tire casing 12, near the sidewall 26. Such a structure, provided with a removeable wall or diaphragm 40, can simplify the manufacture of the tire, as compared to the structure of FIG. 4-6, and provides access to the interior of the outer or peripheral chamber 28 for repairing a puncture when it is desirable to repair such a puncture from the inside of the casing. It will, however, be appreciated that punctures in tubeless tires may generally be repaired by means of hot patches applied to the inside of the tire casing over the puncture, and that the structure in FIG. 11 makes it possible to easily effective such repair after removing the diaphragm 40 by unhooking its flanged edges 42 from the tire internal wall ridges or beads 44.

If so desired, the flexible diaphragm 40 may be permanently attached to the tread 39, proximate the sidewall 12, by means of an appropriate cement applied, prior to assembly or re-assembly, to the engaging surfaces of the diaphragm interlocking flanged edges 42 and the tire internal wall ridges or beads 44, or, alternatively, by vulcanization or chemical bonding.

Figures 12, 14:
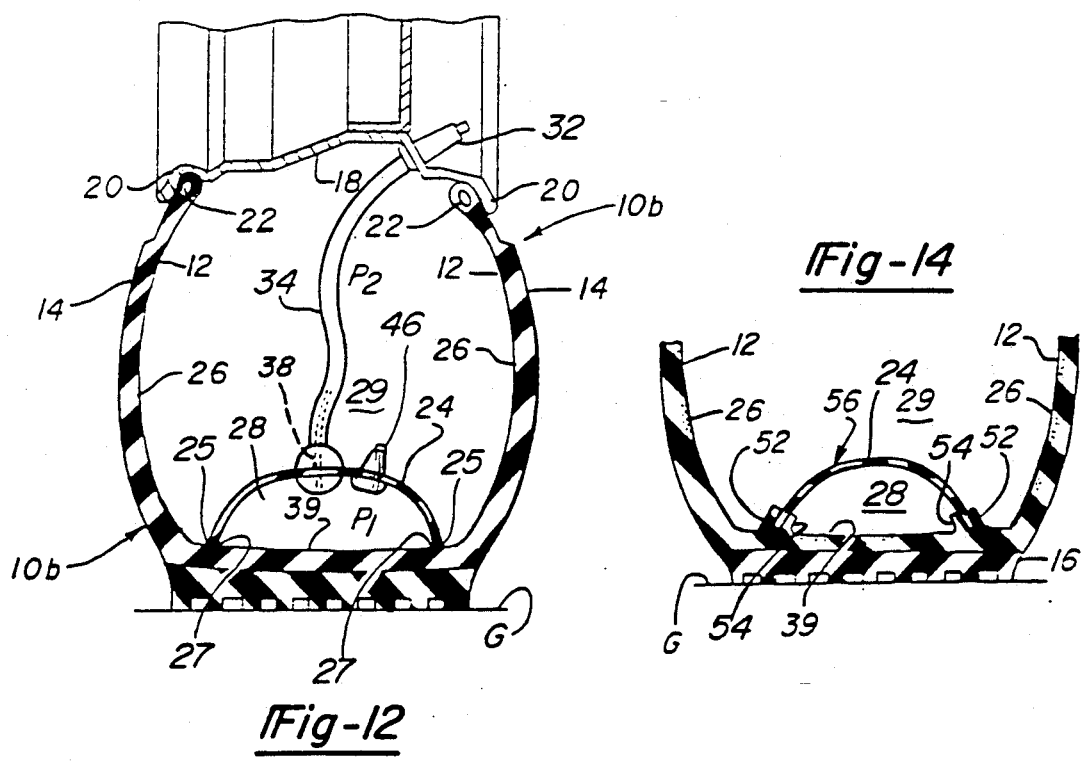
FIG. 12 is a view similar to FIG. 5 but showing another modification thereof.

Instead of inflating the inner chamber by means of an independent valve, the air valve 32 used for inflating the outer chamber may be used for inflating the inner chamber, by way of the arrangement of pneumatic tire 10b illustrated at FIG. 12. A one-way check valve, which may take the form of a conventional air valve 46, is installed through the flexible and elastic partition wall or diaphragm 24 separating the outer peripheral chamber 28 from the inner chamber 29. The outer peripheral wall chamber 28 is inflated by introducing air through flexible hose 34 from the air valve 32 at the appropriate relatively high pressure P1. The valve 46 allows a flow of air from the outer chamber 28 to the inner chamber 29 only when the pressure in the outer chamber reaches a predetermined level (e.g., 50 psi). As the air valve 46 allows flow in one direction only, that is from the outer chamber 28 to the inner chamber 29, this assures the maximum pressure in the outer chamber will never be greater than the predetermined pressure determined by valve 46. The pressure in low pressure chamber 29 can be accurately set by monitoring the pressure through an air valve 30 in the rim, see FIG. 4, as inflation is being completed through air valve 32.

It will be appreciated that in all the structures contemplated for the invention, the partition wall or diaphragm 24 is made of relatively thin, light-weight, collapsible, elastically-deformable and flexible material, such as the natural or synthetic rubber used for manufacturing tire inner tubes and the like, for example. In structures, such as illustrated in FIGS. 4–6 and 12, in which the partition wall or diaphragm 24 is fixedly attached to the internal surface of the tread 39, it is preferable, during the manufacture and for the purpose of the invention, for ease of manufacture and for the purpose of utilizing conventional tire making machinery, to attach the diaphragm through means of a vulcanizing or chemical bonding process, or alternatively, mold the tire in a conventional manner, however providing the interior tread surfaces, as illustrated in FIG. 13, with a bead 52 having a transverse slit 54. Two such parallel beads 52 are provided on the internal surface 39 of the tread near the sidewalls 12. The diaphragm or partition wall 35 is made in the form of a ring or loop of flat thin flexible elastic material 56, similar in thickness to the material used for manufacturing tire inner tubes and the like. The flat material 56 of which the ring or loop is made has an appropriate width greater than the width of the tread, which, after each edge has been inserted in a lateral slit 54, permits the partition wall of diaphragm 24 to be bowed or bulged towards the center of the tire when the outer chamber 29 is inflated at a higher pressure than inner chamber 29, as shown in FIG. 14. Each edge of the ring or loop or flexible elastic material 56 forming the partition wall or diaphragm 24 is cemented in the corresponding slit 54 of the beads 53 or, alternatively and preferably, vulcanized or chemically bonded in position to provide a secure union.

It is readily apparent that because the partition wall or diaphragm 24 separating the two concentric air chambers 28 and 29 is very resilient and elastically deformable, although the outer chamber 28 is inflated with air at a significantly higher pressure P1 than the inner chamber 29 inflated with air at a pressure P2, the invention provides a very effective tire for absorbing overloads and road shocks and bumps. The partition wall or diaphragm 24 has its lateral edges attached to the interior tread 39 of the tire proximate the sidewalls 12, and the outer chamber 28 has a cross-area which is relatively small as compared to the cross area of the inner chamber 29. Dual-chamber motor vehicle pneumatic tires according to the structure of the present invention which make it possible to inflate the outer toroidal chamber 28 at a higher air pressure than the inner chamber 29, provide a relatively small volume and cross-area high pressure chamber behind the tire tread portion in direct contact with the ground, resulting in optimum fuel economy by reducing the area in engagement with the ground and consequently the ground-caused drag, thus increasing durability of the tire and ease of steering. The separate relatively large volume and cross-area low pressure inner chamber 29 provides good riding qualities as a result of efficient shock absorption. The pressure in each chamber is individually secure and may be conveniently and independently varied at will, such as to optimize riding qualities and conditions, and fuel economy under a wide variety of road conditions, vehicle loads and balance, and average driving speed and habits.

Figure 15:
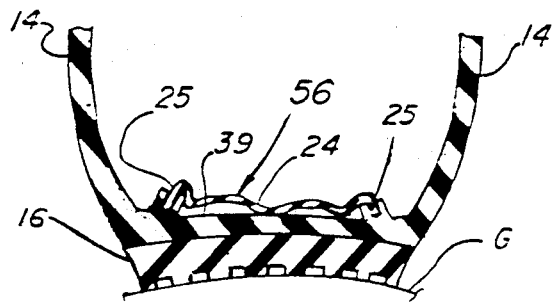
FIG. 15 is a cross-sectional view showing the diaphragm collapsed and an optional concave shape for the tread area, both in the absence of high-pressure air in the outer chamber of the tire.

FIG. 15 shows the condition of the tire when higher air pressure is not present in the outer chamber of the tire. Under this condition, the diaphragm 56 collapses to a relaxed and loose position on the interior floor 39 of the tire. The diaphragms shown in FIGS. 5, 6 and 11 through 13 would also collapse in the same way in the absence of high-pressure air support in the outer chamber. It is because of this collapsible nature of the Diaphragm, and the absence of any internal or external reinforcement or support to fix and hold the position or shape of the diaphragm, that this invention retains unimpeded and unobstructed flexion of the tire and bowing of the sidewalls while providing for two separate chambers with different pressures in each. Also shown in FIG. 15 is an optional concave shape for the tread of the tire which is present in the outer chamber. When the outer chamber is inflated at high pressure, the concave shape of the tread area disappears as it is forced into a flat surface for effective traction and improved weight distribution and road contact. The purpose and function of this concave tread surface is thus only to offset the force of the high pressure in the outer chamber so that such high pressure does not result in a crowned surface in the tread.

Figure 16:
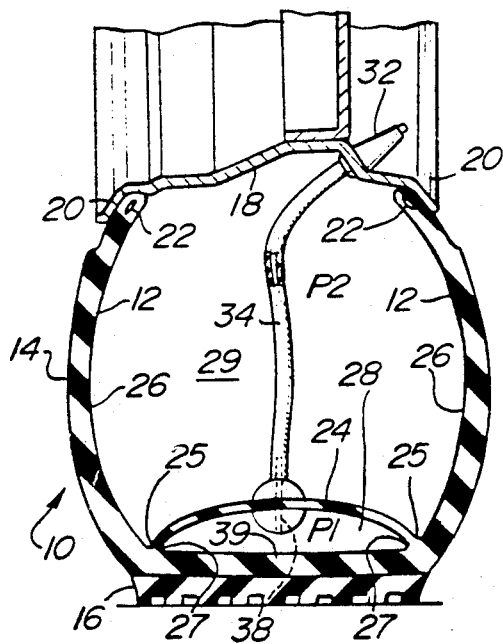
FIG. 16 is a cross-sectional view showing a modification of the invention wherein the diaphragm is joined to the tire casing at the interior junctures of the tread and sidewalls.

FIG. 16 shows a modification of the invention wherein the edges of diaphragm 24 are joined to the inner tread surface 39 of the tire at the junctures of the tread and sidewalls 25. In this modification, there is no attachment of the diaphragm to the base of the inner sidewall itself, so that the base (bottom) of the sidewall is unrestricted in its ability to flex and bow, and so that the interior base of the sidewall is exposed only to the relatively low pressure of the inner chamber.

Figure 17:
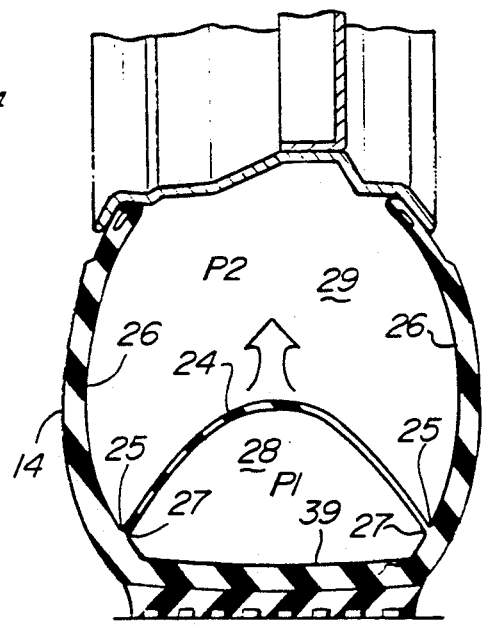
FIG. 17 is a cross-sectional view showing another modification of the invention wherein the diaphragm is jointed to the tire at the lower portion of the sidewalls.

FIG. 17 shows another modification of the invention wherein the edges of the diaphragm 24 are jointed to the tire at the lower part of the sidewalls 26, approximately $\frac{1}{2}"-\frac{3}{4}"$ above the junctures of the sidewalls 26 and the inside tread area 39. In this modification, the width of the diaphragm is increased so that is greatly exceeds the space between the two points to which it is connected (e.g., the diaphragm an be 50% wider than a straight horizontal line between the two points on the lower sidewalls where the diaphragm is connected).

As further shown in FIG. 17, when the outer chamber is inflated at high pressure, the wide diaphragm arches up sharply away from the tread. As a result, the tension placed on the sidewalls by the diaphragm takes the form of an upward thrust, as indicated by the directional arrow in FIG. 17, and the diaphragm does not pull the sidewalls directly toward each other. The width of the diaphragm and its collapsible and flexible nature also provide additional slack in the diaphragm when the tire is compressed by a road shock, further enabling the sidewalls to bow outwardly away from one another. The high arch which results from the relatively wide diaphragm also protects the diaphragm from punctures which could occur at road level.

Figure 18:
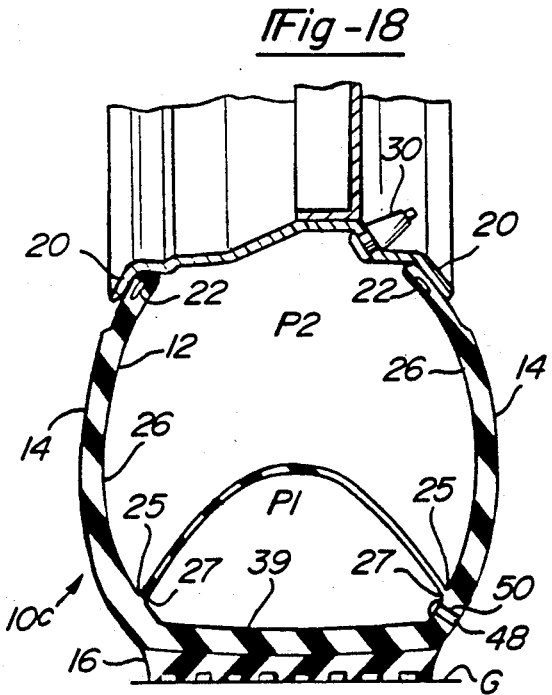
FIG. 18 is a view similar to FIG. 17 but showing a further modification thereof.

In FIG. 18 there is illustrated the same structure as the tire in FIG. 17 according to the present invention wherein the inner chamber 29 is inflated by means of the air valve 30 mounted through the rim 18, and the outer peripheral toroidal chamber 28 is inflated by means of a separate air valve 48 projecting through sidewall 14, at one side of the tire proximate the tread 16. Preferably, the end of the air valve 48 does not project beyond the exterior surface of the sidewall 14, and is disposed in a generally cylindrical recess 50 formed in the sidewall and providing clearance for an air hose fitting to permit inflating the outer toroidal chamber 28 at an appropriate relatively high pressure P1. A rubber cap or plug, not shown, may be used for filling the space in the recess 50 around the end of the air valve 48, to provide a neat appearance and of protecting the open end of the valve from dirt.

Having thus described the present invention by way of examples of practical structures, modifications whereof will be apparent to those skilled in the art, what is claimed as new is as follows:

The embodiments of the invention in which an exclusive property or privilege is claimed are defined as follows:

1. A pneumatic tire mounted on a conventional rim, said pneumatic tire comprising:

a casing having a pair of sidewalls and a tread extending therebetween, said pair of sidewalls mounted to said conventional rim, each of said pair of sidewalls having a first predetermined thickness, said tread having a substantially flat inner surface and a second predetermined thickness;

a flexible collapsible partition wall attached to the inner surface of the tread at positions spaced immediately axially inward from outer edges of the inner surface of said tread so as to define an outer chamber and a concentric inner chamber, said partition wall having a third predetermined thickness substantially thinner than said first predetermined thickness of said pair of sidewalls and substantially thinner than said second predetermined thickness of said tread and having a width and surface area greater than the width and surface area of the tread, with said partition wall being unsupported between its edge portions so as to collapse when there is no air pressure difference between said inner and outer chambers and being elastically deformable when a pressure difference exists between said chambers;

said outer chamber having pressurized air at a first predetermined pressure and said inner chamber having pressurized air at a second predetermined pressure, said first predetermined pressure in said outer chamber being greater than said second predetermined pressure in said inner chamber so as to keep all surface areas of the sidewalls under the lower pressure of the inner chamber, and so as to arcuately and outwardly deform and hold said partition wall in a position with respect to said inner tread surface by air pressure alone, defining a toroidal shape with a first predetermined volume for said outer chamber and defining said inner chamber with a second predetermined volume substantially greater than said first predetermined volume;

said flexible partition wall being elastically deformed to bulge further toward said inner chamber to absorb shocks transmitted through the air at the greater first predetermined air pressure in said outer chamber by an increase in surface area of said bulged partition wall subjected to the lower second predetermined air pressure in said inner chamber; and means for inflating said outer air chamber to said higher first predetermined pressure and inflating said inner air chamber to said lower second predetermined pressure.

2. The pneumatic tire of claim 1 wherein said partition wall is integrally attached to the inner surface of said tread.

3. The pneumatic tire of claim 1 wherein said partition wall is removably attached to the inner surface of said tread.

4. The pneumatic tire of claim 3 wherein said removable partition wall comprises an annular diaphragm having a pair of lateral edge flanges in interlocking engagement with symmetrically disposed projecting ridges formed axially inward of edges of the internal surface of the tread of said tire.

5. The pneumatic tire of claim 1 wherein said inflating means comprises a first air valve disposed through said rim in direct communication with said inner chamber and a second air valve disposed through one of said pair of sidewalls of said casing into said outer chamber.

6. The pneumatic tire of claim 1 wherein said inflating means comprises a first air valve disposed through said rim in direct communications with said inner air chamber and a second air valve disposed through said rim placed in communication with said outer air chamber by a flexible conduit disposed through said inner air chamber and connected to an orifice through said partition wall.

7. The pneumatic tire of claim 1 wherein said inflating means comprises an air valve disposed through said rim and a flexible hose in direct communication with said outer chamber and a one-way valving means allowing flow of air from said outer chamber to said inner chamber when pressure in said outer chamber exceeds a predetermined pressure.

8. The pneumatic tire of claim 1 wherein said tire has a cross-sectional tread surface which is concave when the outer chamber of the tire is not inflated, but which forms a relatively straight, non-concave cross-sectional surface when said outer chamber is inflated at said first predetermined pressure.

* * * * *

UNITED STATES PATENT AND TRADEMARK OFFICE
CERTIFICATE OF CORRECTION

PATENT NO.  : 5,109,905
DATED       : May 5, 1992
INVENTOR(S) : Donald M. Lambe

It is certified that error appears in the above-identified patent and that said Letters Patent is hereby corrected as shown below:

Column 5, line 3, delete "jointed" and insert --joined--;

line 53, delete "discussed" and insert --decreased--;

line 68, delete "is" (second occurrence), insert --if--.

Column 6, line 38, delete "Paten" and insert --Patent--;

line 55, delete "cored" and insert --cord--.

Column 7, line 40, after "chamber" insert --is inflated at higher air pressure than the larger inner chamber--;

lines 41-42, delete "the layer inner chamber, and an annular central or inner chamber".

Column 9, lines 3-4, delete "the circumference" and insert --also contributing--.

Column 10, line 6, delete "at" and insert --to--;

lines 29, 30, delete "remove able" and insert --removable--;

UNITED STATES PATENT AND TRADEMARK OFFICE
CERTIFICATE OF CORRECTION

PATENT NO. : 5,109,905

DATED : May 5, 1992

INVENTOR(S) : Donald M. Lambe

It is certified that error appears in the above-identified patent and that said Letters Patent is hereby corrected as shown below:

Column 10, line 31, delete "FIG." and insert --FIGS.--;

line 39, delete "effective" and insert --effectuate--.

Column 11, lines 13-14, delete "and for the purpose of the invention" and insert --of the dual chamber tire of the invention,--;

line 29, delete "of" and insert --or--.

Column 14, line 34, claim 6, delete "communications" and insert --communication--.

Signed and Sealed this

Tenth Day of May, 1994

Attest:

BRUCE LEHMAN

Attesting Officer

Commissioner of Patents and Trademarks